US012073854B2

(12) United States Patent
Binnamangala Prabhu et al.

(10) Patent No.: US 12,073,854 B2
(45) Date of Patent: Aug. 27, 2024

(54) TECHNIQUES AND DEVICES FOR QUALITATIVE DISK WRITES PERFORMANCE ANTI-PATTERN DETECTION AND MITIGATION

(71) Applicant: APPLE INC., Cupertino, CA (US)

(72) Inventors: Sheyas Binnamangala Prabhu, Santa Clara, CA (US); Anshul Dawra, Campbell, CA (US); Kaiehu H. Kaahaaina, Cupertino, CA (US); Ashish Patro, Santa Clara, CA (US); Akhil Bhutani, Sunnyvale, CA (US); Komlan J. Attiogbe, Dover, DE (US); Shefali Saboo, San Francisco, CA (US); Phillip Azar, Oakland, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 17/500,746

(22) Filed: Oct. 13, 2021

(65) Prior Publication Data

US 2022/0392486 A1 Dec. 8, 2022

Related U.S. Application Data

(60) Provisional application No. 63/197,205, filed on Jun. 4, 2021.

(51) Int. Cl.

| | |
|---|---|
| ***G11B 5/012*** | (2006.01) |
| ***G06F 3/06*** | (2006.01) |
| ***G06F 11/07*** | (2006.01) |

(52) U.S. Cl.

CPC .............. *G11B 5/012* (2013.01); *G06F 3/061* (2013.01); *G06F 3/0653* (2013.01); *G06F 3/067* (2013.01); *G06F 11/0793* (2013.01)

(58) Field of Classification Search

None

See application file for complete search history.

(56) References Cited

U.S. PATENT DOCUMENTS

| | | | |
|---|---|---|---|
| 9,842,017 | B1 | 12/2017 | Zhang et al. |
| 10,824,536 | B1 | 11/2020 | Vyas et al. |

(Continued)

FOREIGN PATENT DOCUMENTS

| | | |
|---|---|---|
| WO | 2020243656 A1 | 12/2020 |

OTHER PUBLICATIONS

Notification Of Transmittal Of The International Search Report And The Written Opinion issued Sep. 18, 2020 in 12 pages.

*Primary Examiner* — Lisa M Caputo
*Assistant Examiner* — Cynthia L Davis
(74) *Attorney, Agent, or Firm* — Kilpatrick Townsend & Stockton LLP

(57) ABSTRACT

A server computer may receive diagnostic logs from a plurality of electronic devices, each having a particular application installed. The diagnostic logs include information about call stacks within the particular application on the plurality of electronic devices for writing data to a storage device that is on each of the plurality of electronic devices. The server computer may filter out a set of call-paths from the call stacks to obtain a set of functions that can be used identify a set of call-path signatures. The server computer may for each function, determine a cumulative measure of write operations to the storage device performed by the function across the electronic devices and identify at least one function from the set of call-path signatures matching one or more predetermined criteria associated with the cumulative measures. The server computer may provide a notification and a corrective action to a developer.

20 Claims, 14 Drawing Sheets

Electronic Device
Operating System 222 224 210
Kernel 214
Kernel Data
Kernel logging routine (Rusage)
212 Storage
204
Visualization Server 208
Instrumentation 220
Operational Metric Routine 226
Third Party Application 202
Aggregation Server 206
Operating System Data 218
Logging Routine 216
204 Devices
200

(56) References Cited

U.S. PATENT DOCUMENTS

| | | | | |
|---|---|---|---|---|
| 11,036,610 | B2 | 6/2021 | Vyas et al. | |
| 2012/0120078 | A1 | 5/2012 | Hubbard | |
| 2018/0205593 | A1* | 7/2018 | Livschitz | G06F 9/5077 |
| 2019/0370141 | A1* | 12/2019 | Choi | G06F 11/3075 |
| 2020/0380033 | A1 | 12/2020 | Vyas et al. | |
| 2021/0011846 | A1* | 1/2021 | Venkatesh | G06N 3/063 |

* cited by examiner

600

Figure 9:
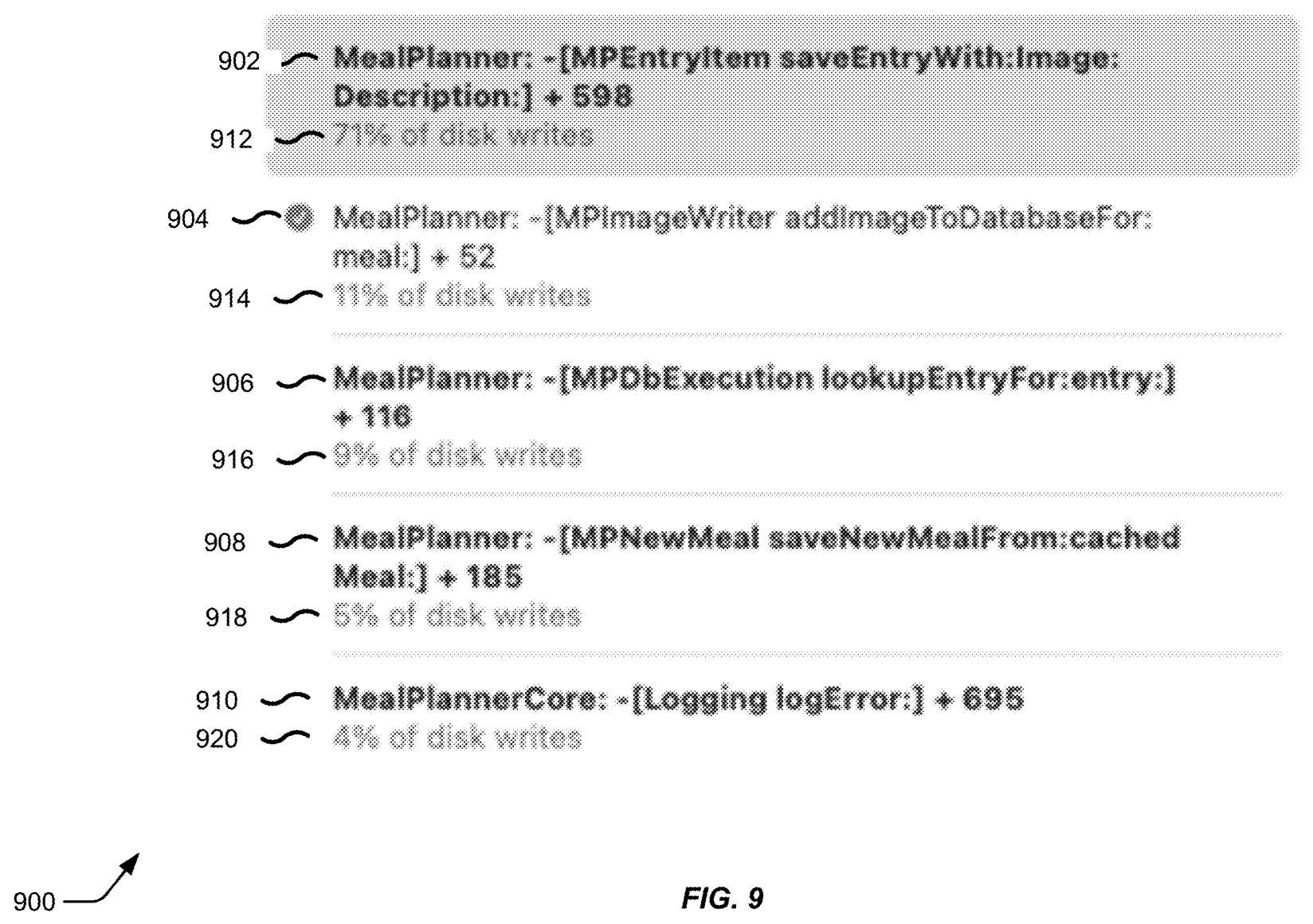

902 MealPlanner: -[MPEntryItem saveEntryWith:Image:Description:] + 598

912 71% of disk writes

904 MealPlanner: -[MPImageWriter addImageToDatabaseFor:meal:] + 52

914 11% of disk writes

906 MealPlanner: -[MPDbExecution lookupEntryFor:entry:] + 116

916 9% of disk writes

908 MealPlanner: -[MPNewMeal saveNewMealFrom:cachedMeal:] + 185

918 5% of disk writes

910 MealPlannerCore: -[Logging logError:] + 695

920 4% of disk writes

| Problem Detected 1202 | Mitigation 1204 |
|---|---|
| SQLite Full Vacuum | Use SQLite incremental vacuum, or vacuum_into |
| Use of serialized Files | Use database or break out the frequently written sections into separate files |
| SQLite Spill | Use appropriate indexes |
| SQLite Journaling | Use WAL mode instead of DELETE mode |
| Pager Stress | Tweak configuration settings |
| High writes due to SQLite Close | Keep the SQLite connection open as long as possible |
| High writes due to HTTP cookies | Alternative APIs |

*FIG. 12*

TECHNIQUES AND DEVICES FOR QUALITATIVE DISK WRITES PERFORMANCE ANTI-PATTERN DETECTION AND MITIGATION

CROSS-REFERENCES TO RELATED APPLICATIONS

This application claims the benefit to U.S. Provisional Application No. 63/197,205, filed Jun. 4, 2021 entitled "Techniques And Devices For Qualitative Disk Writes Performance Anti-Pattern Detection And Mitigation," the disclosures which is incorporated by reference in its entirety.

BACKGROUND

Applications (Apps) that demonstrate poor system behaviors (e.g., excessive solid state drive writes) can adversely affect performance of the App and the electronic device. These performance issues can degrade the overall customer experience and if left uncorrected can even permanently damage the electronic device. Often App developers cannot identify the usage of function calls or ratios of frequency of two function calls that can result in this sub-optimal performance. Additionally, after such suboptimal usage of function calls have been identified by developers, often developers do not know the most efficient way to correct these functions.

BRIEF SUMMARY

Techniques can be implemented to scan the diagnostic logs for an application to identify call-path signatures that can lead to sub-optimal performance issues. A technique can include receiving one or more application diagnostic logs from a plurality of electronic devices executing the application. For a given call-path signature (e.g., a function at a particular location in a stack), a cumulative measure of write operations can be determined and used to identify a problematic calling of a function, e.g., by matching to one or more predetermined criteria associated with problematic cumulative measures. Corrective action (e.g., a notification, suggested solution, etc.) can be provided in response.

An example technique can include analyzing the one or more application diagnostic logs to identify at least one function of a plurality of functions on a predetermined list, e.g., which are associated with problematic cumulative measures and are used as a predetermined criterion. The predetermined list of function can be known to result in sub-optimal App performance (e.g., excessive writes, excessive number of crashes, or excessive energy consumption). Upon identifying at least one function stored on the predetermined list in the one or more application diagnostic logs, the technique can include determining a stored corrective action for the identified function. The technique can include displaying the identified function and the stored corrective action on a display.

These and other embodiments of the invention are described in detail below. For example, other embodiments are directed to systems, devices, and computer readable media associated with methods described herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 9 illustrates an example screen-capture of signatures for a meal planning App.

FIG. 12 illustrates a table that lists exemplary problems detected and proposed or recommended mitigation strategies.

Like reference, symbols in the various drawings indicate like elements, in accordance with certain example implementations. In addition, multiple instances of an element may be indicated by following a first number for the element with a letter or a hyphen and a second number.

DETAILED DESCRIPTION

Figure 1:
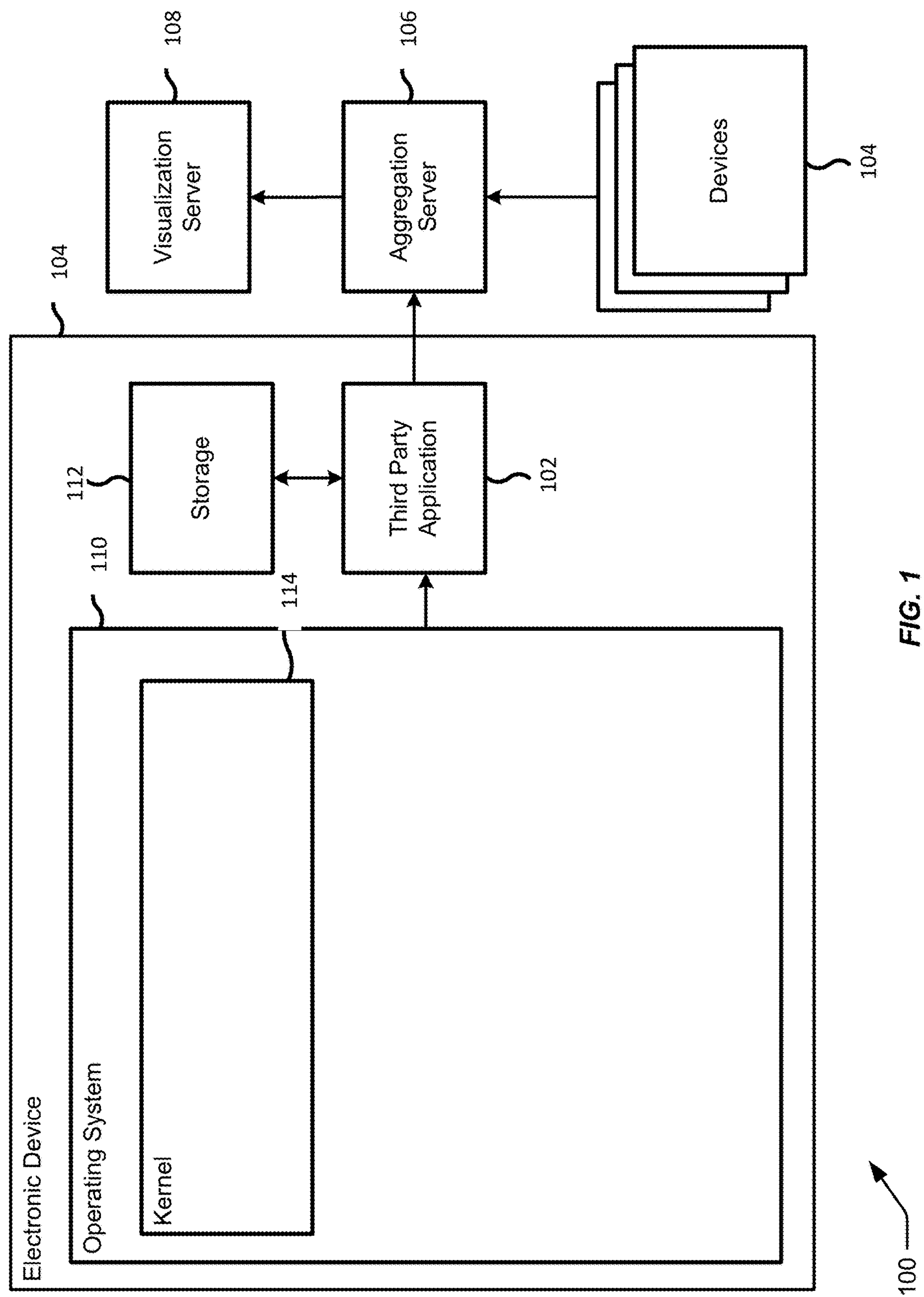
FIG. 1 illustrates a simplified, exemplary diagram of a system for collecting, aggregating, and visualizing operational metrics for evaluating third party applications.

Techniques can be implemented to scan the diagnostic logs for an application to identify one or more call-path signatures that can lead to sub-optimal performance of the application. A technique can include receiving, at a server device, one or more application diagnostic logs from a plurality of electronic devices executing the application. The application can be executed on different type (e.g., a smartphone or tablet) or model (e.g., iPhone X, iPhone 12 Pro Max) devices. The diagnostic logs can identify a version number of the application. For a given call-path signature (e.g., a function at a particular location in a call-stack), a cumulative measure of write operations can be determined and used to identify a problematic calling of a function, e.g., by matching to one or more predetermined criteria associated with problematic cumulative measures. A corrective action (e.g., a notification, suggested solution, etc.) can be determined for the given call-path signature and provided in response.

An example technique can include analyzing the one or more application diagnostic logs to identify at least one function of a plurality of functions on a predetermined list, e.g., which are associated with problematic cumulative measures and are used as a predetermined criterion. The predetermined list of function can be known to result in sub-optimal App performance (e.g., excessive writes, excessive number of crashes, or excessive energy consumption). Upon identifying at least one function stored on the predetermined list in the one or more application diagnostic logs, the technique can include determining a stored corrective action for the identified function. The technique can include displaying the identified function and the stored corrective action on a display.

I. Aggregated Data Metrics

The process of evaluating an application in an integrated development environment (e.g., Xcode) can involve evaluating application diagnostic logs and operational metrics (e.g., disk writes, crash reports, or energy usage) for devices executing the application. The operational metrics can be collected for a variety of different electronic devices, each device can have different capabilities. The devices can be categorized by type (e.g., a smartphone or a tablet computer). The devices can be categorized by mode (e.g., a iPhone X or a iPhone 12 Pro Max). In various embodiments, the devices can be categorized by the version of the operating system that was installed on the device. To obtain more comprehensive results, techniques can collect and aggregate diagnostic logs from multiple devices. For example, some Apps may not have significant problems on a new device with improved processing capabilities but can have significant issues on older devices. By collecting and aggregating data over multiple devices, the techniques can provide more comprehensive evaluation of the application.

A. Collecting and Aggregating Metric Records

The techniques disclosed herein can include a process for data ingestion and processing of raw data that can be used to calculate one or more operational metrics. The raw data for these metrics can be captured from the device kernel, a logging routine (e.g., Powerlog) of the operating system (e.g., iOS), and a hardware logging routine (e.g., Signpost).

FIG. 1 illustrates a simplified, exemplary diagram of a system 100 for collecting, aggregating, and visualizing operational metrics for evaluating third party applications 102. A third-party application 102 is a program (e.g., an application or App) created by a developer that is different from the manufacturer of the electronic device that the application runs on or the owner of the website that offers it. The third party application 102 can be loaded into a memory of the device and be executed on one or more processors of the device. A third party application 102 can present information to a user on a display of the electronic device 104.

The system 100 can include one or more electronic devices 104, an aggregation server 106 and a visualization server 108. The electronic devices 104 can include, but are not limited to, a smartphone, a tablet, a portable computer, or a wearable device. The electronic devices 104 can include various classification as well as different models of devices. The electronic device 104 can execute an operating system 110 to execute one or more instructions from a plurality of code stored in a memory 112 on the electronic device 104. An operating system 110 is a system software that manages hardware and software resources and provides common services for programs (e.g., applications). A kernel 114 is the central part of an operating system 110. The kernel 114 manages the operations of the electronic device 104 and the hardware, most notably memory and central processing unit (CPU) time. The aggregation server 106 can collect metric record data for a plurality of different electronic devices 104 and for calculation of various different operational metrics. The visualization server 108 receives aggregated operational metric data in order to display the operational metrics for evaluation of the performance of third party application 102.

Figure 2:
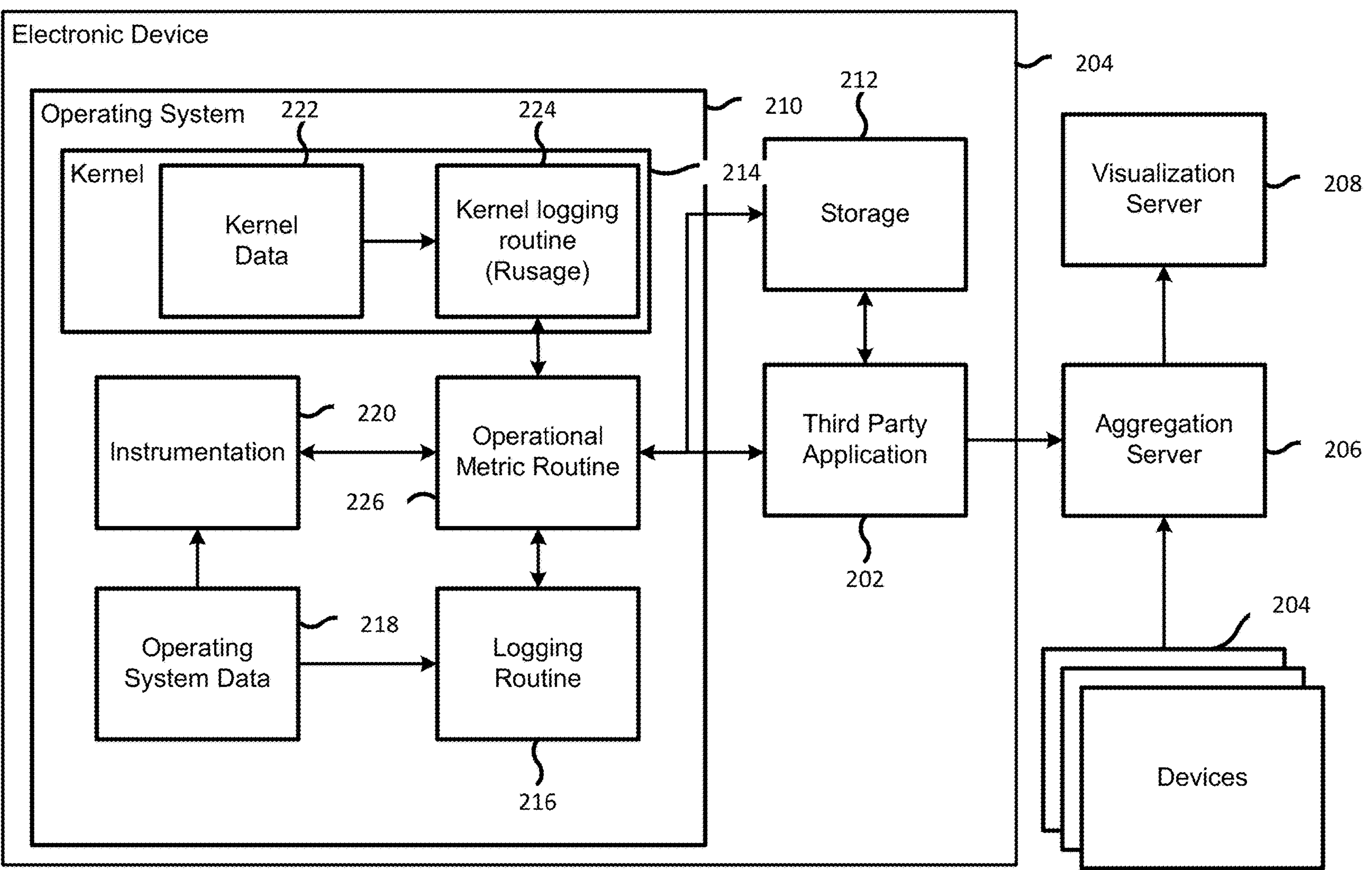
FIG. 2 illustrates an exemplary diagram of a system for collecting, aggregating, and visualizing operational metrics for evaluating third party applications.

FIG. 2 provides additional details for system 200 described for system 100 as depicted in FIG. 1. The third party application 202 can transmit an identifier to the operating system 210. The identifier can cause the operational metric routine 226 to execute a process to collect a plurality of metric records. In some embodiments, the identifier can inform the operational metric routine 226 the types of metrics that the developer desired to collect. In some embodiments, a developer can register the application 202 with the operating system developer. The application registration process can provide information on the application 202 and can inform the operational metric routine 226 of the specific operational metrics that the developer is interested in measuring.

The operating system 210 of the electronic device 204 can include various logging routines 216. In various embodiments, the logging routines can continuously capture data generated by the operating system of the device and save the data in a persistent storage (e.g., a memory). The logging routine 216 can capture operating system data 218 (e.g., foreground time, background time, networking bytes (per application), and location activity). The logging routine 216 can collect the operational data 218 and provide it to operational metric routine 226.

The logging routine 216 can collect metrics on CPU time, GPU time, CPU instructions, display average pixel luminance, cellular networking conditions, number of logical writes, and memory usage. The logging routine 216 captures snapshots for these metrics for all processes and applications running on the operating system 210 from different data sources at significant battery change (SBC) events. These events occur when there is a change in the electronic devices' battery level during the course of normal usage of the device. The logging routine 216 is configurable to allow for additional snapshotting at other important system level events. In some embodiments, once a day, the logging routine 216 summarizes these metrics per application from the previous 24 hours period (midnight to midnight) and delivers the payload to the operational metric routine 226 over a cross-process communication platform (e.g., XPC). Upon receiving this data, the operational metric routine 226 saves this data to its storage 212 (e.g., local persistent storage).

In the kernel 214, a plurality of kernel data 222 can be generated. The kernel data 222 can include CPU/graphics processing unit (GPU) time, number of logical writes to a solid state device (SSD), and memory usage. A kernel logging routine 224 can collect the kernel data 222 and provide it to the operational metric routine 226. The operational metric routine can save the kernel data in the storage 212.

As detailed earlier, the data from different sources on the operating system 210 including the kernel logging routine 224 is snapshotted by the logging routine 216 and delivered to the operational logging routine 216 once/day over a cross-process communication platform (e.g., XPC). The kernel logging routine 224 maintains various cumulative counters per process (e.g., CPU time, GPU time, CPU instructions etc.) which are continuously updated in memory during the execution of these processes.

The operating system 210 can also include instrumentation 220. The instrumentation 220 allows for selective capture of one or more operational metrics surrounding a particular event, during a discrete time period, or during execution of a particular feature of an application 202. The instrumentation 220 can log system level data (e.g., launch and resume times. Hang durations, frame rates). In addition, the instrumentation 220 can be used to set regional markers to evaluate features of the applications 202. The operating system (OS) regional markers can be used to evaluate CPU time, number of CPU instructions, current and peak memory, and logical writes.

Custom logging routine markers (e.g., MXSignposts) are built on top of operating system routine region markers (e.g., os_signpost). Custom logging routines provide a snapshot a subset of metrics for its process from the kernel logging routine 224 and store this data in the metadata field of the operational regional markers. Custom logging routines allow developers to mark critical sections of their code and collect power and performance metrics for those marked sections.

For the system level signpost data, developers internally instrument different parts of the system. For example, launch times are measured by instrumenting the device operating system manager for handling foreground tasks (e.g., Frontboard) with operating system markers (e.g., os_signposts). Custom logging routine markers (e.g., MXSignposts) are distinguished by the system from the other operating system markers (e.g., os_signposts) by using the subsystem field value of os_signposts. Custom logging routine markers are tagged internally with a subsystem value unique to the customer logging routine markers.

The third party application 202 can collect the metric record data (collected from the operational metric routine 226) and save the metric record data to storage 212. In addition, the third party application can transmit the metric record data outside the electronic device 204. The metric record data can be transferred over a network (e.g., the internet). The metric record data can be aggregated with metric data from other devices in the aggregation server 206. The aggregation server 206 can decode the metric record data. A plurality of metadata accompanies the metric record data. The plurality of metadata can identify the classification of model of the electronic device 204 from which the data originated. The aggregation server 206 can save the data to a data structure based on the value of the operation metric. The aggregation server 206 can allow for efficient analysis of the operational metrics.

The visualization server 208 receives aggregated operational metric data in order to display the data for evaluation of the performance of third party application 202.

Figure 3:
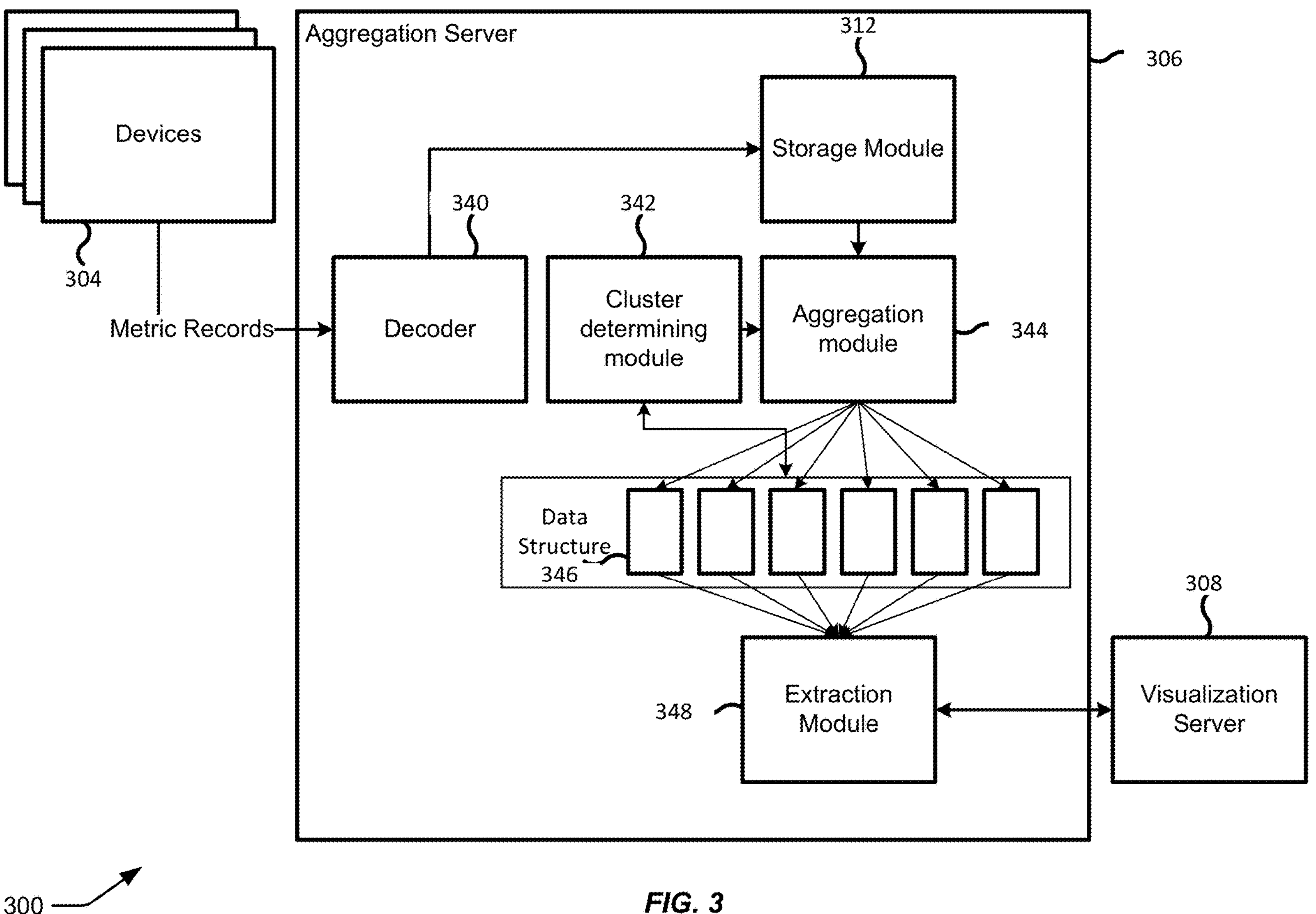
FIG. 3 illustrates an exemplary diagram for an aggregation module.

FIG. 3 illustrates an exemplary embodiment of the aggregation server 300. The aggregation server 306 receives a plurality of metric records from multiple electronic devices 304. The metric records include encoded, compressed files. The decoder 340 decodes and decompresses the metric records and stores the decoded and metric records in the persistent storage 312.

For each version of a third party application and operational metric, a cluster determining module 342 determines a distribution of expected values for that metric. For example, for the hang time metric, the cluster determining module 342 can determine a data structure with a number of clusters to capture incoming metric records based on the value of the metric value. The clusters can correspond to centroids determined from a statistical analysis of the metric values. For example, if the data structure for the hang time metric for version n of the third party application may have a set of ten different clusters for number of hangs per hour of application use. Some embodiments may have more than 10 clusters and some embodiments may have less. The incoming data is compared with the values assigned to each of the clusters. The value can include the following exemplary data structure (e.g., 0-0.5 hangs per hour of use (0-10%); 0.5-1.0 hangs per hour of use (10%-20%), 1.0-3.0 hangs per hour of use (20%-30%), 3.0-5.0 hangs per hour of use (30%-40%), 5.0-7.0 hangs per hour of use (40%-50%), 7.0-8.0 hangs per hour of use (50%-60%), 8.0-10.0 hangs per hour of use (60%-70%), 10.0-15.0 hangs per hour of use (70%-80%), 15.0-20.0 hangs per hour of use (80%-90%), 20 or more hangs per hour of use (90%-100%). Similar data structures can be developed for the various operational metrics.

In the aggregation module 344, the decoded metric record data can be analyzed and placed stored in a data structure 346 based on the classification (e.g., smartphone or tablet) and model (e.g., model of smartphone) for the metric record. The cluster-determining module 342 can periodically reevaluate the size and number of clusters as the data structure 346 receives the metric data. The number of clusters can be varied for each operational metric to allow for rapid retrieval of statistically significant values for the operational metrics.

An extraction module 348 can retrieve operational data based at least in part on a query from the visualization server 308. For example, a developer may be interested in the battery performance for their application for older model device (e.g., iPhone 6). The developer can select "iPhones" for the class of devices. The "iPhone" class would include several different models of iPhones (e.g., iPhone 6, iPhone 6s, iPhone XS, iPhone XS Max). Selecting only the "iPhone" class would result in the extraction module providing data for all iPhone models with existing data, However, selecting "iPhone 6" for the model would only provide operational metric information (e.g., battery performance) for iPhone 6 devices. The extraction module 348 can provide operational values for a particular version of the application (e.g., version 3.0.1). In various embodiments, the extraction module 348 can provide operational values for multiple versions of the application. In some embodiments, the extraction module 348 can provide operational values for only a selected number (i.e., significant versions) of the application. The query for the extraction module 348 can be for all software versions of a particular class, type, and operational metrics. The extraction module 348 can receive a request for certain operational metric data (e.g., power and performance metrics). The extraction module 348 can retrieve the values for the operation metrics from the various data structure 346.

Figure 4:
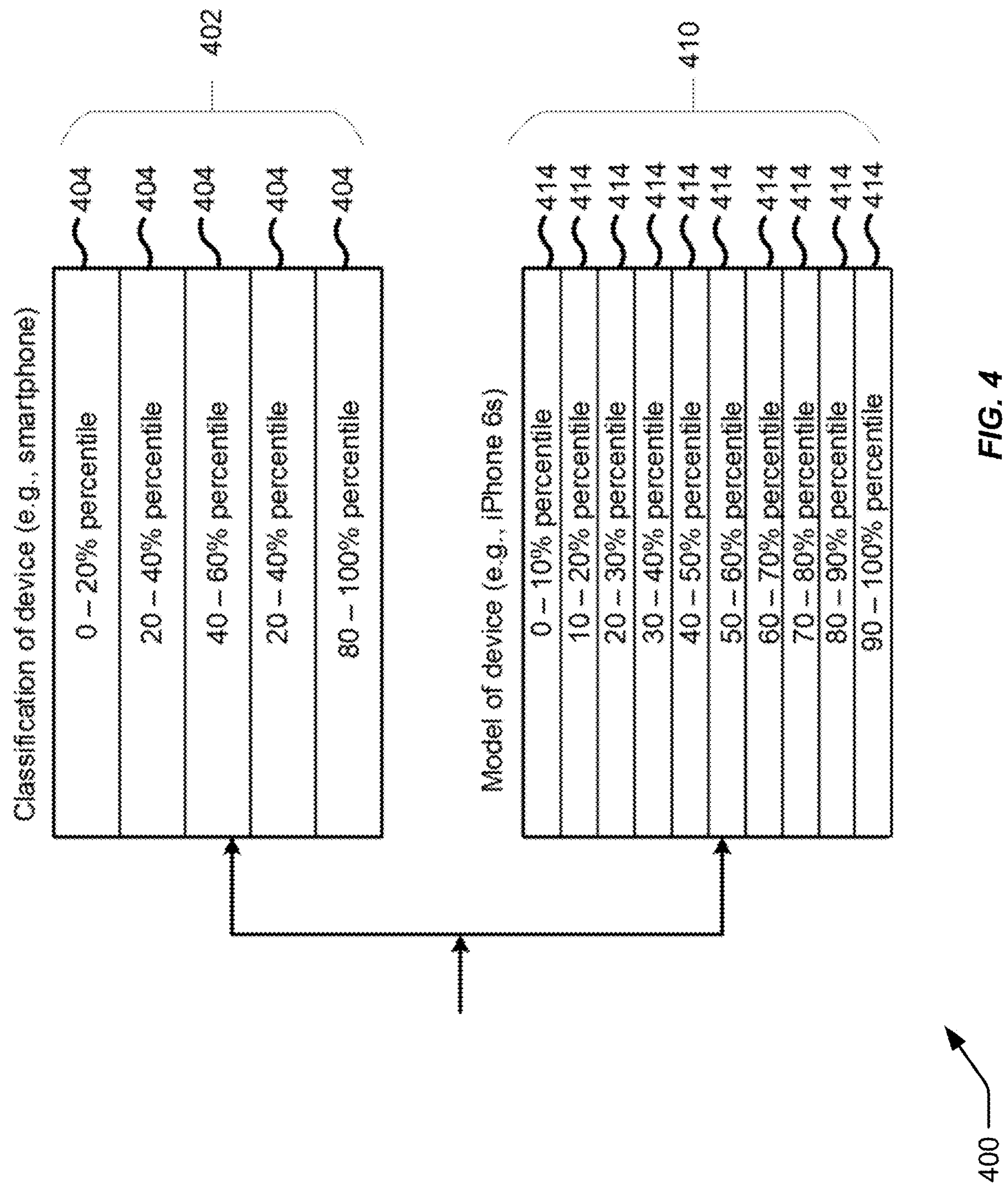
FIG. 4 illustrates a flowchart for assigning metrics to data structures and clusters depending on class and model of the device.

FIG. 4 illustrates an exemplary depiction of the aggregation module 400. The metadata for each of the data records can be analyzed to determine the classification of the device and the specific model of the device. The metric records can be sorted by the classification of the device (e.g., smartphone or tablet) and model of the device (e.g., iPhone 6s, iPhone 7, iPhone 7s, iPhone 8, iPhone 8s, iPhone X, iPhone XS, iPhone XS Max). For each of the clusters there is a first data structure 402 that sorts the incoming metric record to the appropriate cluster 404 according to the value of the metric record. For example, the cluster for smartphone can have the first data structure 402 with five different clusters 404. For the five clusters 404, each cluster 404 can represent a $20^{th}$ percentile of the data. For a second data structure 410 of device cluster (e.g., the iPhone 6S) there can be ten different clusters, each cluster 414 having a $10^{th}$ percentile of data.

Both examples in FIG. 4 are exemplary and the data structures 402, 410 can have any number of clusters 404, 414 as required to properly segregate the data for easy statistical analysis.

B. Visualization of Operational Metrics

Visualizing operational metrics can be provided in a consolidated manner. A challenge is to depict multiple pieces of information to a developer in a way that is easy to analyze and make decisions. A display can utilize one or more histograms, segmented circles, and/or bar graphs to effectively present data for rapid analysis. The information can be presented by application versions with significant changes.

The technique can aggregate data from millions of devices to construct a web API endpoint from which an integrated development environment (e.g., Xcode) can connect to it and provide a developer a view of those metrics in the field. A focus is application developers beyond the top 25 developers who may not be able to develop their own analytics routines. In addition, it is desirable for a developer to select the classification and models to better understand the power and performance of the application for older devices as compared with newer devices with increased memory and battery capacity.

Figure 5:
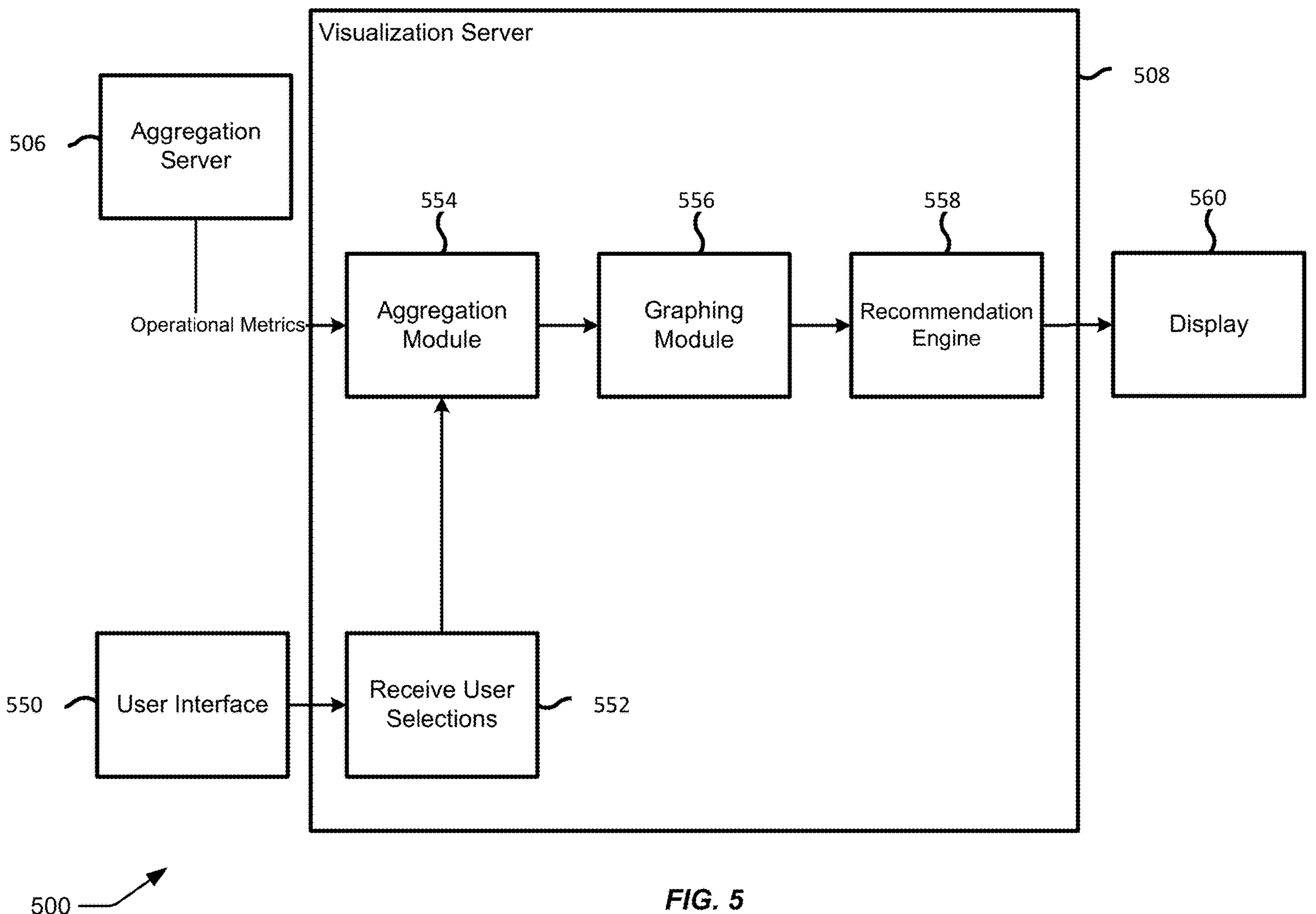
FIG. 5 illustrates an exemplary system for visualization.

FIG. 5 depicts an exemplary embodiment of the visualization process 500 including a visualization server 508. The visualization server 508 can receive the operational metrics from the aggregation server 506. The visualization server 508 can present a user interface 550 for a developer to enter selections 552 to customize the display of operational metric data. These selections 552 can include but are not limited to the classification and/or model of the device from which the data originated. The selections 552 can also include the percentile for the data (e.g., top percentiles or typical).

Based on the selections of the developer, operational metric data is aggregated in an aggregation module 554 for clusters and sub-clusters. A graphing module 556 receives the aggregated data for preparation for display. Next, a recommendation engine 558, analyzes the aggregated data and prepares one or more recommendations for the developer. Finally, the aggregated data can be presented on one or more displays 560.

II. Identifying App Performance Issues

Devices can collect diagnostic logs for the performance of Apps on the device. These logs can be stored on the device. In various embodiments, a user can opt-in or opt-out of providing transmitting these diagnostic logs to a server device for analysis. A server device can receive the diagnostic logs and analyzed by a developer tool. The developer tool many not have the resources to analyze all the diagnostic logs that may be received. Various thresholds can be established to limit the number of diagnostic logs that the developer tool needs to analyze. When the App performance issue concerns excessive writes to the solid-state drive. An excessive number of writes to a solid-state device can shorten the lifetime of a solid-state device.

A. Thresholds Limits for Analyzing Call Logs

Certain electronic device can sample and store process call-stacks periodically (e.g., every 10 MB of writes). A call stack is a stack data structure that stores information about the active subroutines of a computer program. This kind of stack is also known as an execution stack, program stack, control stack, run-time stack, or machine stack, and is often shortened to just "the stack." Although maintenance of the call stack is important for the proper functioning of most software, the details are normally hidden and automatic in high-level programming languages. Many computer instruction sets provide special instructions for manipulating stacks. A call stack can be used for several related purposes, but a main reason for having one is to keep track of the point to which each active subroutine should return control when it finishes executing. An active subroutine is one that has been called, but has yet to complete execution, after which control should be handed back to the point of call. Such activations of subroutines may be nested to any level (recursive as a special case), hence the stack structure.

In various embodiments, thresholds can be established to determine when diagnostic logs will be sent from a user device to the server device for analysis. For example, various thresholds can include an amount of writes (e.g., 1 GB, 4 GB, 16 GB) in a predetermined time period (e.g., a day), the diagnostic logs for the application can be saved as a report file. The mobile device can transmit the diagnostic logs over to the application servers periodically (e.g., once per day). Application issues resulting in sub-optimal performance are not always apparent to developers. For example, some patterns of an App accessing a relational database management system (e.g., SQLite) can result in a high number of write events that is undesirable. The first part of correcting this issue is being able to identify potential issues for the developer.

For crash reports, there can be a threshold number of crashes within a predetermined time period (e.g., x number of crashes within a day) prior to storing and transmitting the diagnostic logs for the App.

For energy consumption, there can be a threshold amount of energy consumed within a predetermined time period (e.g., x % of total battery level consumed within an hour) prior to storing and transmitting diagnostic logs for the App.

Figure 6:
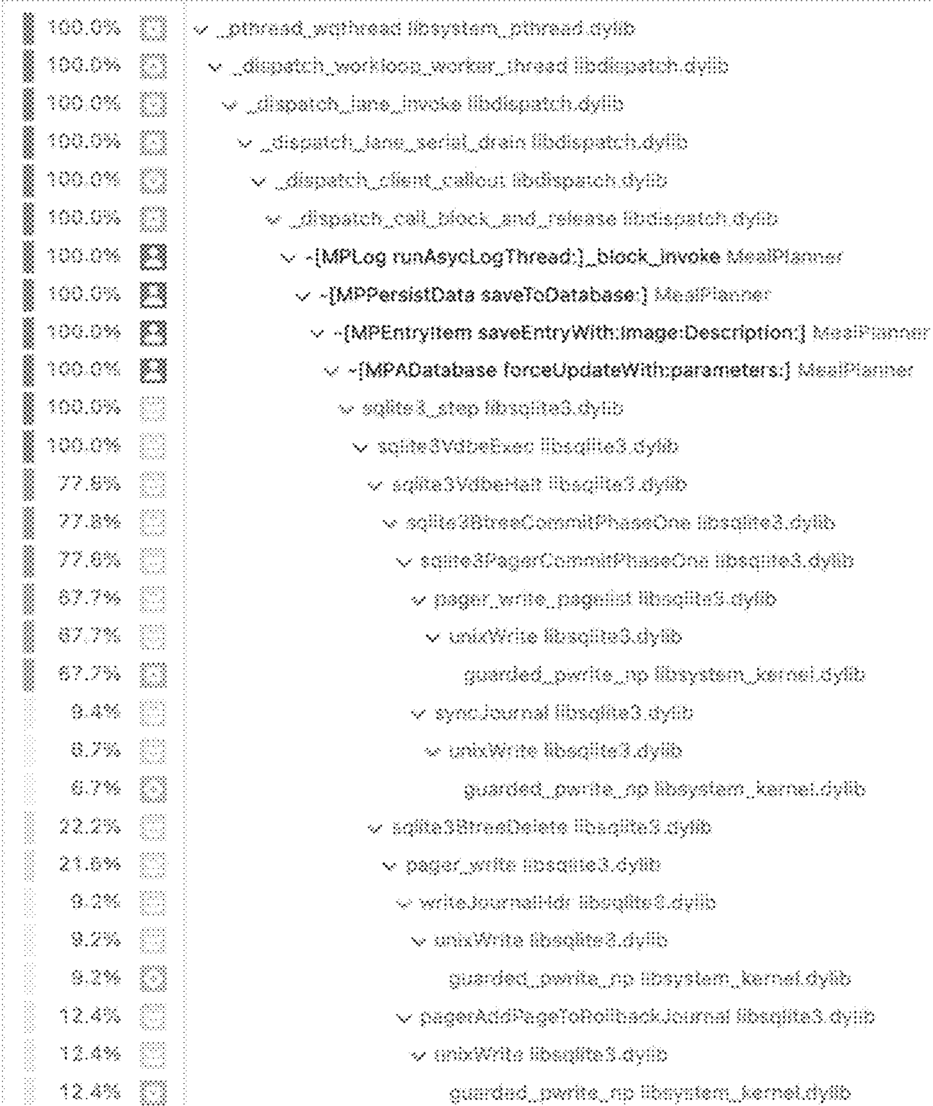
FIG. 6 illustrates a diagnostic log for an application that can be produced by a developer tool.

FIG. 6 illustrates a diagnostic log 600 for an application that can be produced by a developer tool (e.g., Xcode). The diagnostic log can be aggregated across all devices. The developer tools can be used by developers to build, diagnose, and improve applications for a platform or for specific devices for a platform. Different types of logs can be provided. For example, crash reports describe how an App terminated, and document the code running on each thread at the time of the crash. Jetsam event reports can describe the system-memory conditions under which the operating system terminated an App. Device console logs can contain detailed information on operations that occur in both the operating system and Apps. Certain electronic devices can maintain a continuous in-memory transcript of operations in the operating system and individual Apps. These logs can be reviewed after an issue occurs. Some issues, such as problems installing an App, can be diagnosed by reviewing the operating system logs using the App (e.g., Console App on macOS).

B. Searching the Diagnostic Logs

The diagnostic log 600 can be analyzed for identifying one or more functions that may cause sub-optimal performance issues with App. For example, if the App is exhibiting a high number of writes, the diagnostic log 600 can be used to determine the functions that are known to cause an excessive number of writes. These known functions can be stored on a list in a memory of the server device. The diagnostic logs can be searched to identify the one or more functions from the list on the server. The diagnostic log 600 can also be analyzed for certain patterns of functions. The patterns can include specific function calls that have been previously identified in the list. After identifying the function or the pattern of functions, the diagnostic tool can flag the function in the lines of code and provide the call-signature to be displayed as an issue for the developer.

In various embodiments, the list functions can be hard coded on the server device. The list can be pre-determined for use against all applications. In various embodiments, the list of functions can be dynamic and adjusted by adding new functions on the list as new issues are identified by developers. In various embodiments, developers can submit proposed functions for inclusion on the list of problematic functions based on their experience. In various embodiments, machine learning can be employed to develop and maintain the list of functions.

The diagnostic logs can be processed in near real-time (e.g., through an application monitoring engine (e.g., a Spark backend job). The diagnostic logs 600 can be divided into individual call-paths. The database library calls in the call-path can be filtered and the remaining functions can be considered the call-path signature. This is a way to bucketize the diagnostic logs into specific types. In various embodiments, App providers can receive over 150 million disk write diagnostic logs each day, and the techniques can track cumulative writes for a given signature across all the diagnostic logs.

Figure 7:
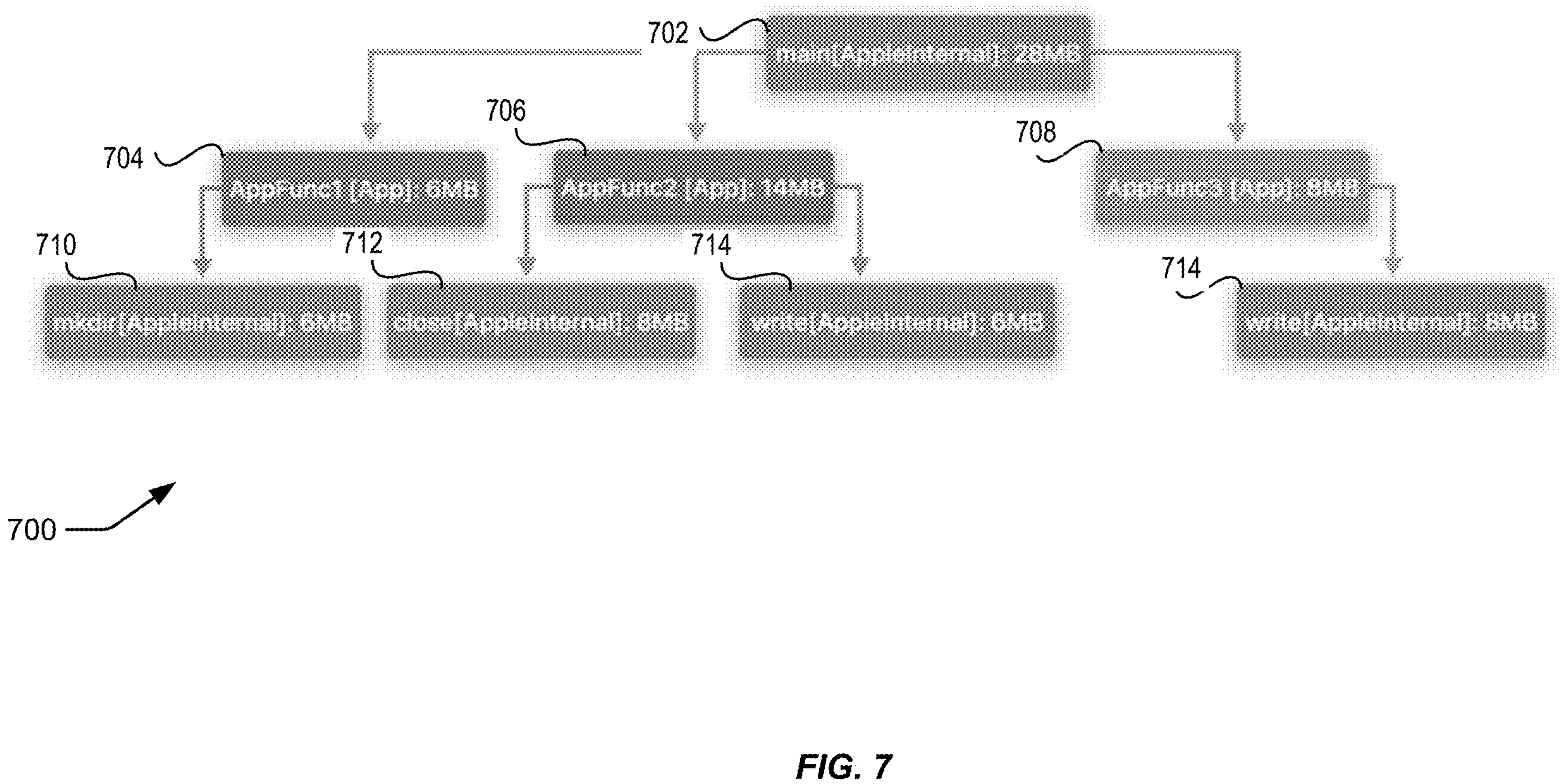
FIG. 7 illustrates a simplified illustrative example for signaturization.

FIG. 7 provides a simplified illustrative example for signaturization. For example, the call-stack tree 700 can be divided into a plurality of branches based on function. For example, the main App 702 can be divided into Function1 704, Function2 706, and Function3 708. While three functions are shown, the techniques can sort the App into numerous functions. Each of the primary functions (e.g., Function1 704, Function2 706, and Function3 708) can have sub-functions (e.g., create new directory 710, close 712, and write 714). In this way, the technique can provide a list of functions that lead to sub-optimal performance (e.g., excessive write functions).

The call-stack tree 700 of FIG. 7 can be converted into a signature list.

C. Creating the Signature List

A signature list identified one or more problematic functions that can result in sub-optimal performance of the application. The signatures in the list can identify the function that contributes to the sub-optimal performance (e.g., excessive writes) and a corresponding metric to quantify the extent that the function contributes to the performance issue.

Figure 8:
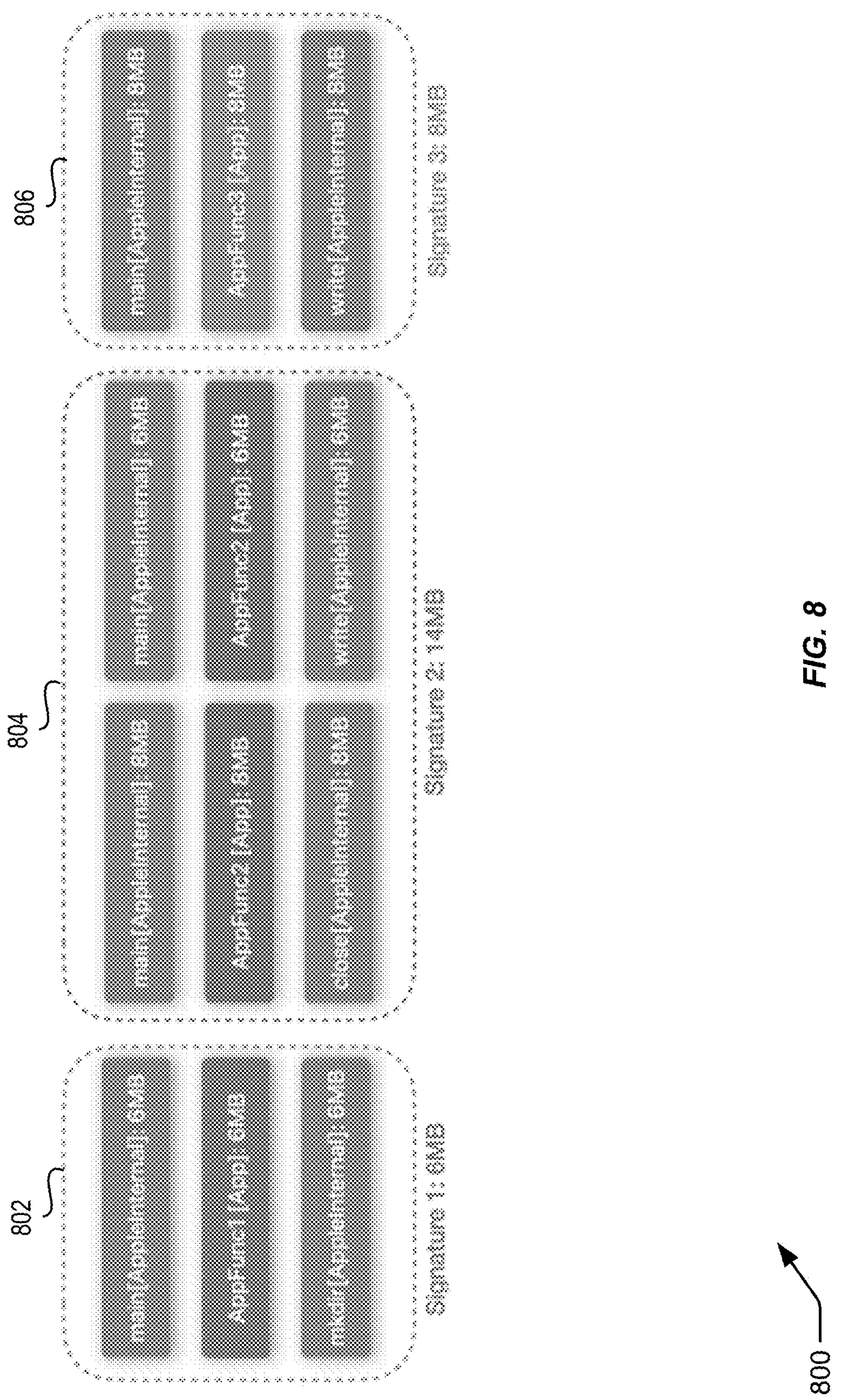
FIG. 8 illustrates exemplary signature list derived from a call-stack tree.

FIG. 8 illustrates exemplary signature list derived from a call-stack tree. The exemplary signature list identifies Signature1 802, Signature2 804, and Signature3 806. Signature1 802 concerns the create directory function and results in 6 MB of disk writes. Signature2 804 concerns the close and write functions and accounts for 14 MB of disk writes. Signature3 806 concerns a write function and accounts for 8 MB of disk writes. The backend table can be updated for these signatures accordingly. The signature list helps identify the top call-paths leading to performance issues (e.g., excessive writes) for a given App across all devices. The developer can use the signature list to identify problematic issues identified by the developer tool. The signature list helps a developer quickly identify problematic issues in the App code, and even quantify how much of a problem each issue is. For example, the signature list can identify how many writes each signature is responsible for the App.

The signature list can be derived via a two-step process. In a first step, the call stacks that are received and stored can be tree like structures. The techniques can split these structures up into individual call paths. As an example, the tree from FIG. 7 can be split into four individual call paths as illustrated in FIG. 8. In a second step, for the individual call paths, the techniques can ignore most of the operating system library functions (e.g., the Apple Internal library functions), retaining only the App's functions and certain key operating system library functions. The techniques can group the individual call paths into signatures based on the retained functions. For example, in FIG. 8, the two call paths in the middle can be grouped into one signature since the retained function is "AppFunc2" in both call paths.

FIG. 9 illustrates an example screen-capture 900 of signatures for a meal planning app. The exemplary signature list is for the MealPlanner application. The top call-paths can provide developers insights on what aspects of the App may be causing sub-optimal performance or excess resource usage (e.g., excessive writes, crashes, or excessive energy usage). The signature list identifies five different signatures: media 902, database saving 904, data lookup 906, saving updates 908, and logging operations 910. Each signature has an associated value for disk writes, specifically 71% 912 for media 902, 11% 914 for database saving 904, 9% 916 for data lookup 906, 5% 918 for saving updates 908, and 4% 920 for logging operations 910. The top call-paths can provide the developers insights on what aspects of the App may be causing sub-optimal performance (e.g., excessive writes). The top signatures list can be derived by splitting each diagnostic log into multiple signatures and tracking the writes for each signature across all diagnostic logs for the App.

D. Matching Signatures to Corrective Actions

Identifying the functions that may lead to performance issue is one aspect of the disclosed techniques. The diagnostic tool can use the list of performance issues and reference the functions of the list with a list of corrective actions associated with the functions. In this way, the diagnostic tool not only identifies problematic functions, but also can recommend corrective actions that could be taken to improve the performance of the application.

Figure 10:
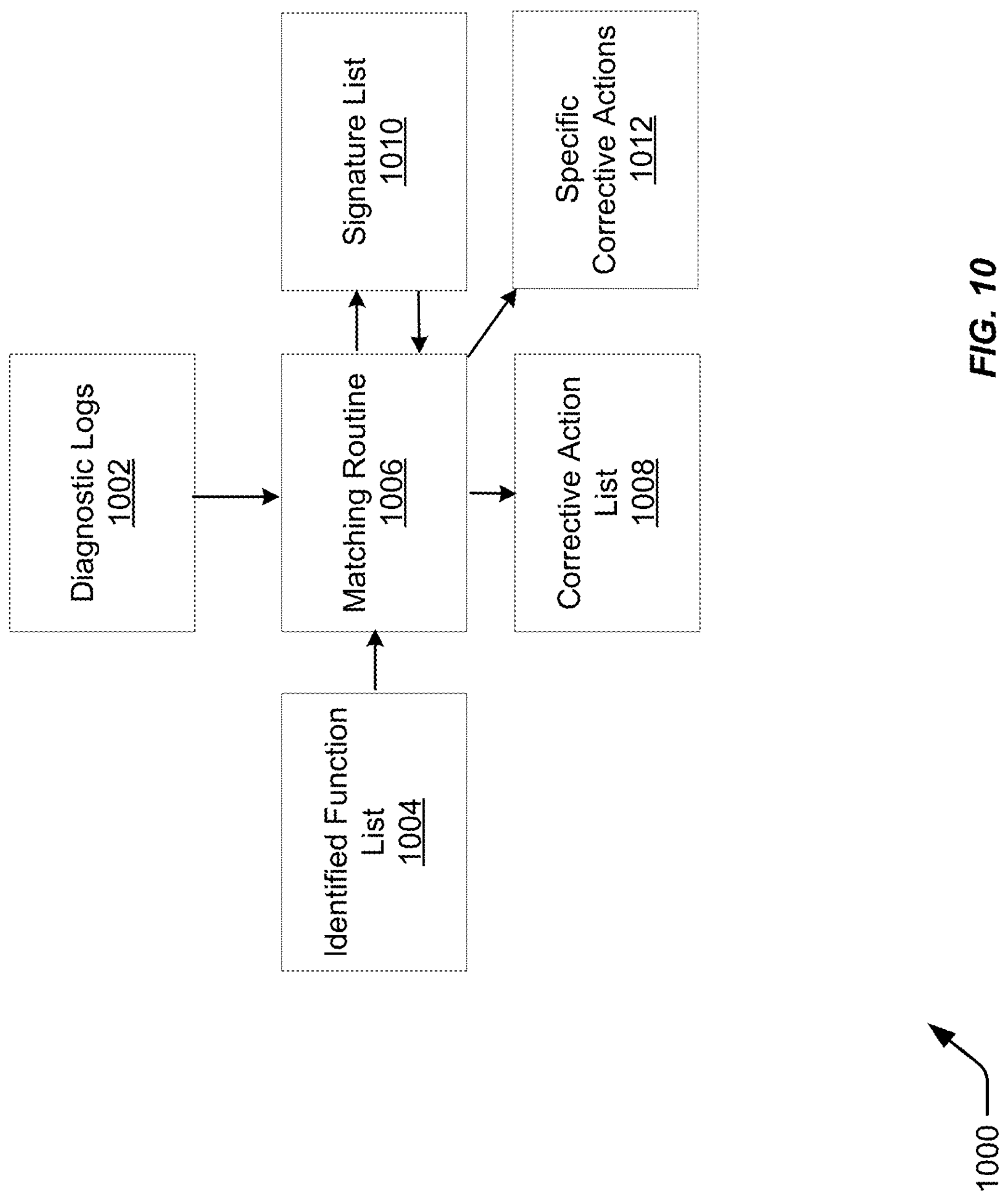
FIG. 10 illustrates an exemplary process for matching one or more functions in in diagnostic logs with the identified function list using a matching routine.

FIG. 10 illustrates an exemplary process 1000 for matching one or more functions in in diagnostic logs 1002 with the identified function list 1004 using a matching routine 1006. The functions that are matched using the matching routine 1006 can be placed on the signature list 1010. In various embodiments, the diagnostic logs 1002 and the identified function list 1004 can be stored in a relational database. The relational database can include a relational database management system (RDBMS) that is a software system that maintains the database. The relational database can use structured query language (SQL) for querying and maintaining the database. If a function is found in the identified function list 1004 is found in the diagnostic logs 1002 it can be listed in the signature list 1010.

The matching routine 1006 can be broken into following steps: First, the relevant functions can be identified either based on exact string match or regex searches. Next, the techniques can apply AND, OR, NOT operations on relevant functions. For example, if call path contains "syncJournal" OR "pagerAddPageToRollbackJournal" functions, it indicates inefficient SQLite journaling. If call path contains "executeFetchRequest" AND NOT "vdbeSorterList-ToPMA," then this indicates SQLite spill due queries with DISTINCT or GROUP BY. In some cases, the techniques can take into account the ratio of writes of two function calls as an indicator of underlying inefficiency. For example, the following ratio being high indicates operations that cause high file system metadata writes such as writes due to creat( )+unlink( ) writes due to write( ).

The matching routine 1006 can also review the list of functions in the signature list 1010 to see if there is a stored corrective active for the specific function in the corrective action list. The corrective action list 1008 can be stored in a relational database. If there is a corrective action for the identified function on the signature list 1010, the specific corrective action can be listed on the specific correction actions list 1012.

In one non-limiting example, when Apps use relational database management systems (e.g., SQLite) for storage and perform queries that involve "ORDER BY," "GROUP BY," and "DISTINCT," it can be important to use indexes. Without indexes, the query performance not only slows down significantly but also results in excessive writes. For example, consider an e-mail App that stores messages in a relational database management system (e.g., SQLite) format. To show all inbox messages in chronological order, the App runs the query "SELECT*FROM messages WHERE folder LIKE 'Inbox' ORDER BY sent_time." With an index on sent-time, the relational database management system reads the messages in order and returns the matching rows. Without an index, the relational database management system must create a temporary B-tree in memory and read in while whole table, performing the sort on that B-tree. If this B-tree is too large for the in-memory cache, the relational database management system writes it to the disk as "spill files," slowing down the SELECT query. The techniques can catch these instances of spill and severity of it, by searching disk write logs for functions that the relational disk management system uses while spilling to disk.

E. Diagnostic Tool User Interface

A diagnostic tool can generate one or more graphical user interfaces to assist a developer identify potential issues and discover corrective actions. The user interface can list the application current being evaluated. The user interface can also list one or more signature lists of functions for the particular evaluation (e.g., excessive writes analysis). One exemplary user interface is illustrated in FIG. 11

Figure 11:
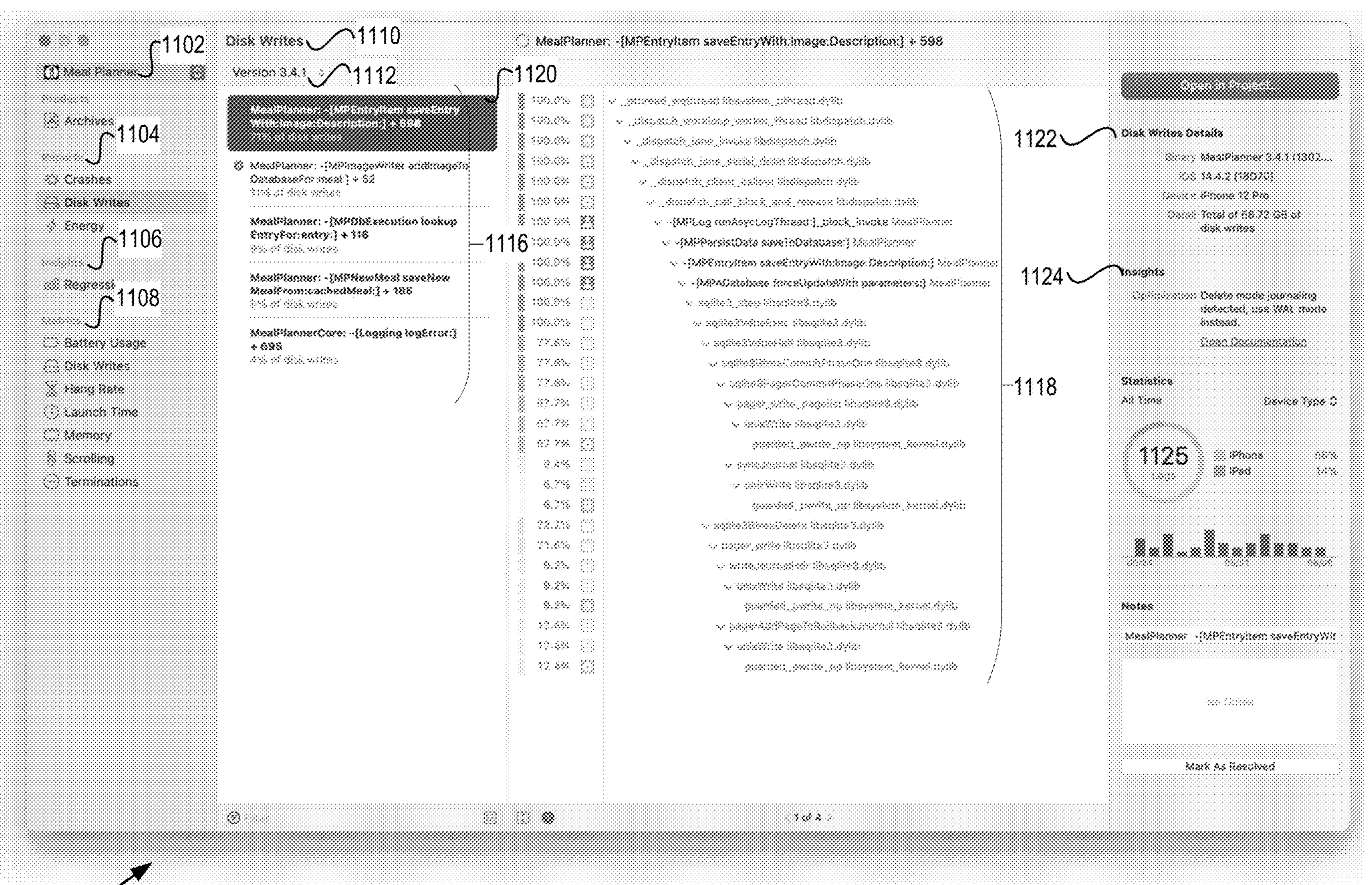
FIG. 11 illustrates an exemplary user interface of a developer tool that can be used to evaluate and develop applications.

FIG. 11 illustrates an exemplary user interface 1100 of a developer tool (e.g., Xcode) that can be used to evaluate and develop applications. The exemplary user interface 1100 illustrates a name of the application 1102 (e.g., MealPlanner), the type of report 1104 (e.g., Crashes, Disk Writes, Energy), corrective actions or insights 1106, and metrics 1108 (e.g., battery usage, disk writes, hang rate, launch time, memory, scrolling, terminations). In FIG. 11, the current mode 1110 is disk writes. The user interface 1100 also displays the version number 1112 of the App.

The user interface 1100 can display a signature list 1116 for the application. The signature list 1116 can display top call-paths for the application. The signature list 1116 can display information for each of the top call-paths (e.g., a percentage of disk writes for each of the top call-paths). The call-paths 1118 for the selected signature 1120 is also illustrated. The selected signature 1120 indicates that it represents 71% of disk writes. The details section 1122 provides information regarding the version of the selected application, the device tested (e.g., iPhone 12 Pro) and details of the disk writes for the test. For example, for the exemplary test a total of 68.72 GB of disk writes were performed.

The user interface 1100 can also provide a corrective action 1124 for the developer. For example, the corrective action can include instructions for the developer to improve the performance (e.g., reducing the number of writes). For example, the exemplary user interface 1100 in FIG. 11 recommends that the developer "delete mode journaling detected; use write ahead logging (WAL) mode instead."

III. Suggesting Mitigation Actions

FIG. 12 illustrates a table 1200 that lists exemplary problems detected 1202 and proposed or recommended mitigation strategies 1204, also called corrective actions. The problems detected list 1202 can be stored in a memory of the server device. The table 1200 can be updated to add or remove problems and/or mitigation techniques and additional functions are added or removed. The mitigations strategies 1204 can apply across various different applications being evaluated. The problems detected 1202 and mitigation strategies 1204 are exemplary only and the techniques described herein are not limited to those illustrated in table 1200. For example, in one example the problem detected 1202 can include "High writes due to SQLite Close." The recommended mitigation strategy 1204 for this problem can include "Keep the SQLite connection open as long as possible." The list of problems detected 1202 and the mitigation strategies are exemplary and are not meant as a limitation. In some embodiments, some problems detected 1202 can have multiple mitigation strategies 1204.

In various embodiments, the mitigation strategies 1204 can be displayed in a graphic user interface (e.g., the user interface 550 as shown in FIG. 5). In various embodiments, the problem detected 1202 and the mitigation strategies 1204 can be sent to a developer through an electronic message.

Figure 13:
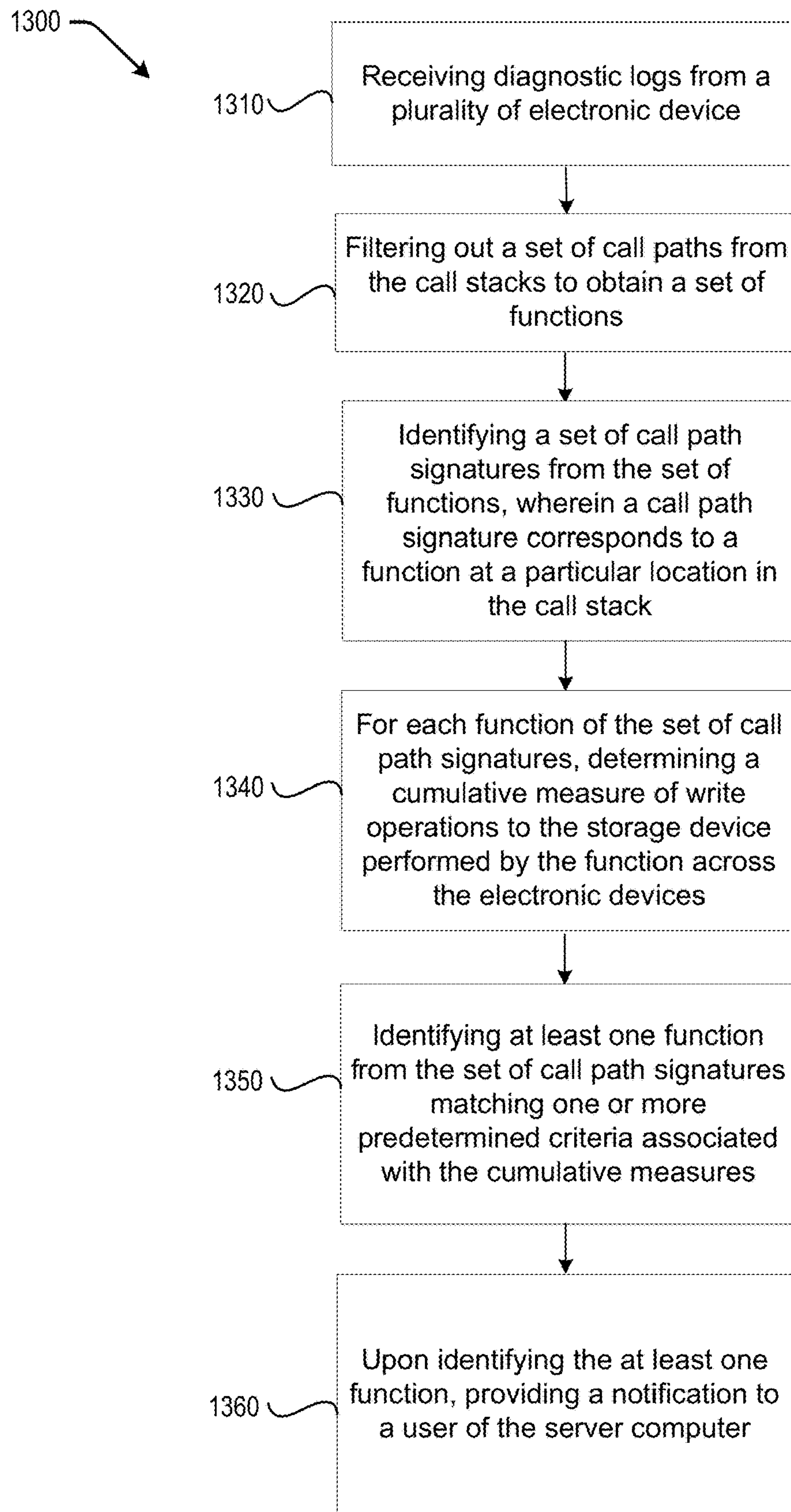
FIG. 13 is a flowchart of an example process associated with techniques and devices for qualitative disk writes performance anti-pattern detection and mitigation.

IV. Exemplary Technique for Qualitative Disk Write Performance Anti-Pattern Detection and Mitigation FIG. 13 is a flowchart of a process 1300 associated with techniques and devices for qualitative disk writes performance anti-pattern detection and mitigation. In some implementations, one or more process blocks of FIG. 13 may be performed by a server device (e.g., server device 1400). In some implementations, one or more process blocks of FIG. 13 may be performed by another device or a group of devices separate from or including the server device. Additionally, or alternatively, one or more process blocks of FIG. 13 may be performed by one or more components of device 1400, such as processor 1418, computer readable medium 1402, input/output subsystem 1406, operating system 1422 and/or applications 1434.

At block 1310, process 1300 may include receiving, over a network, diagnostic logs from a plurality of electronic devices. In various embodiments, the diagnostic logs can be received from only a single device. Each electronic device can have a particular application installed. The diagnostic logs can include information about call stacks within the particular application on the plurality of electronic devices for writing data to a storage device that is on each of the plurality of electronic devices. For example, the server device may receive, over a network, diagnostic logs from a plurality of electronic devices, each having a particular application installed, the diagnostic logs including information about call stacks within the particular application on the plurality of electronic devices for writing data to a storage device that is on each of the plurality of electronic devices, as described above. The diagnostic logs can be stored on an electronic device that is executing the application. The diagnostic logs can be transmitted to a server device via wired or wireless transmission. The diagnostic logs can be transmitted to the server device via a network (e.g., the Internet). The diagnostic logs are not limited to write logs but can include logs for other metrics (e.g., crash logs, energy logs, CPU usage).

In various embodiments, the receiving the one or more application diagnostic logs occurs after an application crosses a threshold writes to a disk greater in a predetermined time period. For example, the threshold writes can occur when the writes exceed 1 GB for the application in a given day. In various embodiments, multiple thresholds (e.g., 4 GB, 16 GB) can be used in a predetermined time period.

At block 1320, process 1300 may include filtering out a set of call-paths from the call stacks to obtain a set of functions. For example, the server device may filter out a set of call-paths from the call stacks to obtain a set of functions. The techniques can use a predetermined ignore list of functions in operating system internal libraries. All functions on this list can be filtered out.

At block 1330, process 1300 may include identifying a set of call-path signatures from the set of functions, where a call-path signature corresponds to a function at a particular location in the call stack. For example, the server device may identify a set of call-path signatures from the set of functions, wherein a call-path signature corresponds to a function at a particular location in the call stack, as described above. The set of functions can stored in a library and can be known based at least on known performance issues. The set of call-path signatures can identify an issue of at least one of excessive writes, excessive crashes, and excessive energy usage for the App. For example, the set of functions can identify a set of functions that are known to produce an excessive number of writes.

In various embodiments, just the presence of the function in the call stack is enough to trigger an identification for process improvement.

In an example, in the relational database management system (e.g., SQLite) there can be different kinds of journaling. In journaling, the techniques try to ensure that the data cannot become corrupted, even at the transactions are abandoned, and addresses the data to ensure that the data stays safe. There are ways of achieving that and some are more efficient than others. In various embodiments, the techniques can detect a function that indicated using the wrong mode to use more journaling to generate the application. Therefore, the techniques detect these modes, just the presence of the function is enough. It may not matter how much of data is written by the function, but fact that the function exists is enough to indicate that there is a problem. In other cases where the value matters how much of the writes are coming from those given function that matters. In other embodiments, what matters is the ratio between two different functions is what matters.

At block 1340, for each function of the set of call-path signatures, a cumulative measure of resource usage performed by the function across the electronic devices is determined. In various embodiments, the resource usage can include write operations to the storage device. In various embodiments, the resource usage can include crashes of the App. The resource usage can also include the energy consumed (e.g., battery usage) of the device executing the App. For example, the server device may for each function of the set of call-path signatures, determining a cumulative measure of write operations to the storage device performed by the function across the electronic devices, as described above. As examples, the cumulative measure of resource usage can comprise a number of calls to write to the drive or an amount of data. Certain electronic device can sample and store process call-stacks periodically (e.g., every 10 MB of writes). In various embodiments, on the electronic device where the diagnostic log is collected and transmitted, every 10 MB write a sample of the process call stack is taken and stored. This may not be periodic on the time scale since write patterns can be random. After the counter exceeds the threshold writes, the operating system can be triggered to transmit the diagnostic logs to the service device.

In various embodiments, the call-path signatures include one or more of using delete mode journaling, significant writes to serialized files, SQLite writes due to full vacuum, writes due to misconfiguration of HTTP cookies, and significant writes due to files being frequently opened and closed.

At block 1350, process 1300 may include identifying at least one function from the set of call-path signatures matching one or more predetermined criteria associated with the cumulative measures. For example, the server device may identify at least one function from the set of call-path signatures matching one or more predetermined criteria associated with the cumulative measures, as described above. In various embodiments, the predetermined criteria can include being on a predetermined list of function signatures known to have data write issues. For example, if call path contains "syncJournal" OR "pagerAddPageToRollbackJournal" functions, it indicates inefficient SQLite journaling. In another example, if call path contains "_executeFetchRequest" AND "vdbeSorterListToPMA", this indicates SQLite spill due to queries with ORDER BY. In other example, if call path contains "_executeFetchRequest" AND NOT "vdbeSorterListToPMA", this indicates SQLite spill due to queries with DISTINCT or GROUP BY. "NSKeyedArchiver archiveRootObject:toFile:" OR—"NSDictionary(NSDictionary) writeToFile:atomically:" OR "NSXMLParser finishIncrementalParse" can all be indicators of serialized files. The following ratio can be used to indicate operations that cause high file system metadata writes:

writes due to creat( )+unlink( )/writes due to write( )

As an example, a known write issue can occur while performing queries with a relational database without using indexes. For example, in a search of an email App, the device writes data to a disk because there is too much data store in the in-memory cache.

Another example of a function that can have known write issues can be the unlink function. The unlink function is akin to a delete function in this system. However, unlink is an identifier. Another example is an escalating App for a shared file that opens and closes the shared file frequently thereby opening the connection to the relational database management system (e.g., SQLite). In this example, the system can open the connection to the relational database management system, make a query, and then close the relational database management system. In this example, it may be more efficient to keep the file open as compared to keeping the connection closed and opening only when needed. In this way the connection can be terminated when the connection is lost. In these situations when the file is left open, there can be more writes to the relational database management system resulting in inefficiencies that can be resolved using various mitigation strategies.

In various embodiments, a ratio of two functions can be considered when identifying at least on function. For example, function sequence such as a create-write-delete sequence may generate a pattern for a file system that can produce excessive writes. In various embodiments, by keeping the file open, the system could have saved the pattern around the metadata and avoid an excessive number of writes.

At block 1360, process 1300 may include upon identifying at least one function and providing a notification to a user of the server computer. For example, the server device may, upon identifying at least one function, provide a notification to a user of the server computer, as described above. For example, if the call path contains "syncJournal" OR "pagerAddPageToRollbackJournal" functions, it indicates inefficient SQLite journaling.

In various embodiments, the process 1300 includes determining a stored corrective action for the identified function. The technique can include searching the library for stored corrective actions. For example, for excessive write functions the technique may determine that write ahead logging (WAL) mode is more efficient than delete mode. WAL mode is an opt in mode and the developer would need to know that it exists to take advantage of the mode. In most cases, it is more efficient. In various embodiments, the process 1300 can include displaying the identified function and the stored corrective action on a display.

In various embodiments, the process 1300 can include generating and sending an electronic message notification to the developer. The electronic message can include the identified function and the corrective action.

Process 1300 may include additional implementations, such as any single implementation or any combination of implementations described below and/or in connection with one or more other processes described elsewhere herein.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

In various embodiments, a server device can include one or more memories; and one or more processors in communication with the one or more memories and configured to execute computer-executable instructions stored in the one or more memories to performing operations of a method described above.

In various embodiments, a non-transitory computer-readable medium storing a plurality of instructions that, when executed by one or more processors of a computing device, cause the one or more processors to perform operations of any of the methods described above.

V. Example Electronic Device

Figure 14:
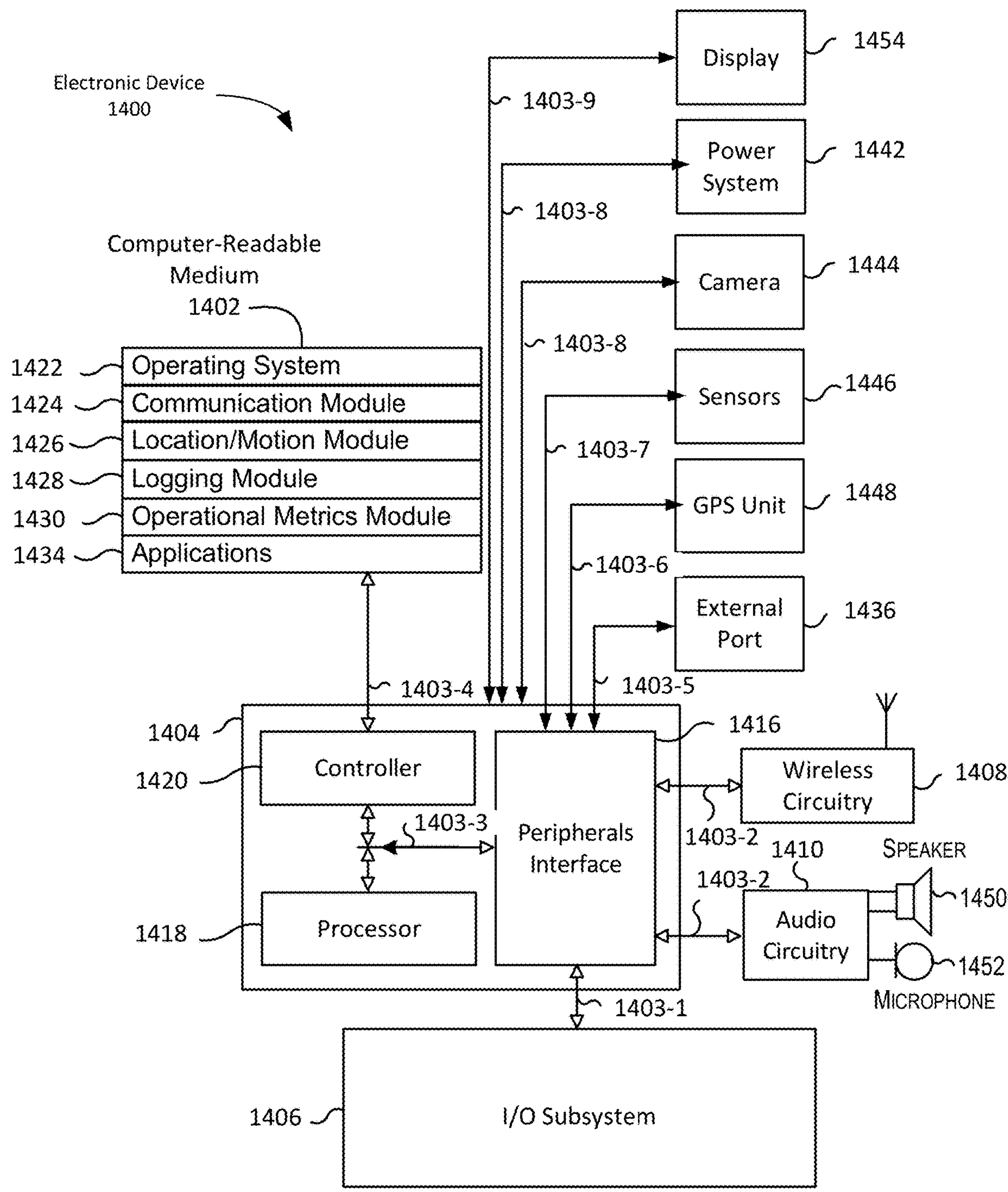
FIG. 14 illustrates a block diagram for an exemplary device to perform the one or more techniques described herein.

FIG. 14 is a block diagram of an example electronic device 1400. Device 1400 generally includes computer-readable medium 1402, control circuitry 1404, an Input/Output (I/O) subsystem 1406, wireless circuitry 1408, and audio circuitry 1410 including speaker 1450 and microphone 1452. These components may be coupled by one or more communication buses or signal lines 1403. Device 1400 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 14 is only one example of an architecture for device 1400, and that device 1400 can have more or fewer components than shown, or a different configuration of components. The various components shown in FIG. 14 can be implemented in hardware, software, or a combination of both hardware and software, including one or more signal processing and/or application specific integrated circuits.

Wireless circuitry 1408 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1408 can use various protocols, e.g., as described herein. In various embodiments, wireless circuitry 1408 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1408 is coupled to control circuitry 1404 via peripherals interface 1416. Peripherals interface 1416 can include conventional components for establishing and maintaining communication between peripherals and. Voice and data information received by wireless circuitry 1408 (e.g., in speech recognition or voice command applications) is sent to one or more processors 1418 via peripherals interface 1416. One or more processors 1418 are configurable to process various data formats for one or more applications 1434 stored on medium 1402.

Peripherals interface 1416 couple the input and output peripherals of device 1400 to the one or more processors 1418 and computer-readable medium 1402. One or more processors 1418 communicate with computer-readable medium 1402 via a controller 1420. Computer-readable medium 1402 can be any device or medium that can store code and/or data for use by one or more processors 1418. Computer-readable medium 1402 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)). In some embodiments, peripherals interface 1416, one or more processors 1418, and controller 1420 can be implemented on a single chip, such as control circuitry 1404. In some other embodiments, they can be implemented on separate chips.

Processor(s) 1418 can include hardware and/or software elements that perform one or more processing functions, such as mathematical operations, logical operations, data manipulation operations, data transfer operations, controlling the reception of user input, controlling output of information to users, or the like. Processor(s) 1418 can be embodied as one or more hardware processors, microprocessors, microcontrollers; field programmable gate arrays (FPGAs), application-specified integrated circuits (ASICs), or the like.

Device 1400 may include storage and processing circuitry such as control circuitry 1404. Control circuitry 1404 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1404 may be used to control the operation of device 1400. This processing circuitry may be based on one or more microprocessors, microcontrollers, digital signal processors, baseband processor integrated circuits, application specific integrated circuits, etc.

Control circuitry 1404 may be used to run software on device 1400, such as internet browsing applications, voice-over-internet-protocol (VOIP) telephone call applications, email applications, media playback applications, operating system functions, etc. To support interactions with external equipment, control circuitry 1404 may be used in implementing communications protocols. Communications protocols that may be implemented using control circuitry 1404 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 1400 may include input/output subsystem 1406. Input/output subsystem 1406 may include input-output devices. Input/output devices may be used to allow data to be supplied to device 1400 and to allow data to be provided from device 1400 to external devices. Input/output devices may include user interface devices, data port devices, and other input-output components. For example, input/output devices may include one or more displays (e.g., touch screens or displays without touch sensor capabilities), one or more image sensors 1444 (e.g., digital image sensors), motion sensors, and speakers 1450. Input-output device may also include buttons, joysticks, scrolling wheels, touch pads, key pads, keyboards, microphones 1452, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 1400 also includes a power system 1442 for powering the various hardware components. Power system 1442 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1400 includes an image sensor 1444 (e.g., a camera). In some embodiments, device 1400 includes sensors 1446. Sensors can include accelerometers, compass, gyrometer, pressure sensors, audio sensors, light sensors, barometers, and the like. Sensors 1446 can be used to sense location aspects, such as auditory or light signatures of a location.

In some embodiments, device 1400 can include a Global Positioning System (GPS) receiver, sometimes referred to as a GPS unit 1448. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1418 run various software components stored in medium 1402 to perform various functions for device 1400. In some embodiments, the software components include an operating system 1422, a communication module 1424 (or set of instructions), a location module 1426 (or set of instructions), a logging module 1428, an operational metrics module 1430, and other applications 1434 (or set of instructions).

Operating system 1422 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1424 facilitates communication with other devices over one or more external ports 1436 or via wireless circuitry 1408 and includes various software components for handling data received from wireless circuitry 1408 and/or external port 1436. External port 1436 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1426 can assist in determining the current position (e.g., coordinates or other geographic location identifiers) and motion of device 1400. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1426 receives data from GPS unit 1448 and analyzes the signals to determine the current position of the mobile device. In some embodiments, location/motion module 1426 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1408 and is passed to location/motion module 1426. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1400 based on the position coordinates of the corresponding transmitters. Regardless of the specific location technology used, location/motion module 1426 receives information from which a location fix can be derived, interprets that information, and returns location information, such as geographic coordinates, latitude/longitude, or other location fix data.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 1400 (e.g., portions of the display cover layer, portions of a plastic antenna window in a metal housing sidewall portion of housing, etc.). With one illustrative configuration, some or all of rear face of device 1400 may be formed from a dielectric. For example, the rear wall of housing may be formed from glass plastic, ceramic, other dielectric. In this type of arrangement, antennas may be mounted within the interior of device 1400 in a location that allows the antennas to transmit and receive antenna signals through the rear wall of device 1400 (and, if desired, through optional dielectric sidewall portions in housing). Antennas may also be formed from metal sidewall structures in housing and may be located in peripheral portions of device 1400.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Device 1400 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 1400 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 1400. As an example, antennas may be mounted at one or both ends of device 1400 (e.g., along the upper and lower edges of housing, at the corners of housing, etc.).

Antennas in device 1400 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 1400 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1444 may include one or more visible digital image sensors (visible-light cameras) and/or one or more infrared digital image sensors (infrared-light cameras). Image sensors 1444 may, if desired, be used to measure distances. For example, an infrared time-of-flight image sensor may be used to measure the time that it takes for an infrared light pulse to reflect back from objects in the vicinity of device 1400, which may in turn be used to determine the distance to those objects. Visible imaging systems such as a front and/or rear-facing camera in device 1400 may also be used to determine the position of objects in the environment. For example, control circuitry 1404 may use image sensors 1444 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1404 may rely entirely upon image sensors 1444 to perform simultaneous localization and mapping, or control circuitry 1404 may synthesize image data with range data from one or more distance sensors (e.g., light-based proximity sensors). If desired, control circuitry 1404 may use display to display a visual representation of the mapped environment.

Input-output devices may include motion sensor circuitry. Motion sensor circuitry may include one or more accelerometers (e.g., accelerometers that measure acceleration along one, two, or three axes), gyroscopes, barometers, magnetic sensors (e.g., compasses), image sensors (e.g., image sensor 1444) and other sensor structures. Sensors 1446 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1404 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1404. Movement generation circuitry may include electromechanical actuator circuitry that, when driven, moves device 1400 in one or more directions. For example, movement generation circuitry may laterally move device 1400 and/or may rotate device 1400 around one or more axes of rotation. Movement generation circuitry may, for example, include one or more actuators formed at one or more locations of device 1400. When driven by a motion control signal, actuators may move (e.g., vibrate, pulse, tilt, push, pull, rotate, etc.) to cause device 1400 to move or rotate in one or more directions. The movement may be slight (e.g., not noticeable or barely noticeable to a user of device 1400), or the movement may be substantial. Actuators may be based on one or more vibrators, motors, solenoids, piezoelectric actuators, speaker coils, or any other desired device capable of mechanically (physically) moving device 1400.

Some or all of movement generation circuitry such as actuators may be used to perform operations that are unrelated to rotation of device 1400. For example, actuators may include vibrators that are actuated to issue a haptic alert or notification to a user of device 1400. Such alerts may include, for example, a received text message alert identifying that device 1400 has received a text message, a received telephone call alert, a received email alert, an alarm notification alert, a calendar notification alert, or any other desired notification. By actuating actuator, device 1400 may inform the user of any desired device condition.

Motion sensor circuitry may sense motion of device 1400 that is generated by movement generation circuitry. If desired, motion sensor circuitry may provide feedback signals associated with the sensed motion of device 1400 to movement generation circuitry. Movement generation circuitry may use the feedback signals to control actuation of the movement generation circuitry.

Control circuitry 1404 may use motion sensor circuitry and/or movement generation circuitry to determine the angle of arrival of wireless signals received by device 1400 from another electronic device. For example, control circuitry 1404 may use movement generation circuitry to move device 1400 from one position to another. Motion sensor circuitry may be used to track the movement of device 1400 as it is moved between the different positions. At each position, control circuitry 1404 may receive wireless signals from another electronic device. Control circuitry 1404 may process the received wireless signals together with the motion data from motion sensor circuitry to more accurately determine the position of the other electronic device. The use of motion generation circuitry is merely illustrative, however. If desired, motion sensor circuitry may track movement of device 1400 that is not caused by motion generation circuitry. This may include a user's natural, unprompted movement of device 1400 and/or the user's movement of device 1400 after the user is prompted (by display, audio circuitry 1410, a haptic output device in device 1400, or any other suitable output device) to move device 1400 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 1408 may include radio-frequency transceiver circuitry for handling various radio-frequency communications bands. For example, wireless circuitry 1408 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 1400 can be switched out of use and higher-performing antennas used in their place.

Wireless communications circuitry can include circuitry for other short-range and long-range wireless links if desired. For example, wireless communications circuitry may include circuitry for receiving television and radio signals, paging system transceivers, near field communications (NFC) circuitry, etc.

The electronic device can include a logging module 1428. The logging module 1428 once activated can receive and store event data that occurs on the electronic device. The event data can include but is not limited to central processing unit (CPU) time, graphics processing unit (GPU) time, memory information, launch time, hang time, average picture luminance (APL), frame rate, logical writes to a solid state device.

The electronic device can also include an operational metrics module 1430. The operational metrics module 1430 can receive the event data from the logging module and convert the event data into operational metrics. The metrics can include metadata indicating the operating system 1422 version number for the electronic device 1400, the class for the device 1400 and the model number for the device 1400.

The one or more applications 1434 on device 1400 can include any applications installed on the device 1400, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1406 can be coupled to a display 1454 (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1406 can include a display and user input devices such as a keyboard, mouse, and/or trackpad. In some embodiments, I/O subsystem 1406 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1402) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1406 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1400 can include a touchpad (not shown) for activating or deactivating particular functions. In some embodiments, the touchpad is a touch-sensitive area of the device 1400 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data available from specific and legitimate sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide corrective actions into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All publications, patents, and patent applications cited herein are hereby incorporated by reference in their entirety for all purposes.

What is claimed is:

1. A method performed by a server computer, the method comprising:

aggregating diagnostic logs received over a network from a plurality of electronic devices, each having a particular application installed, the diagnostic logs including information about call stacks within the particular application on the plurality of electronic devices for writing data to a storage device that is on each of the plurality of electronic devices, wherein the diagnostic logs are received after an application crosses a threshold amount of writes to a disk within a predetermined time period;

filtering out a set of call-paths from the call stacks to obtain a set of functions;

identifying a set of call-path signatures from the set of functions, wherein a call-path signature corresponds to a function at a particular location in the call stack;

for each function of the set of call-path signatures, determining a cumulative measure of resources usage by the function across the electronic devices;

identifying at least one function from the set of call-path signatures matching one or more predetermined criteria associated with the cumulative measure;

determining a corrective action for the identified at least one function; and providing the corrective action for the identified at least one function to a user of the server computer.

2. The method of claim 1, wherein the cumulative measure of resource usage comprises a number of calls to write.

3. The method of claim 1, wherein the cumulative measure of resource usage comprises an amount of data written to the disk.

4. The method of claim 1, wherein the predetermined criteria includes being on a predetermined list of function signatures known to have known data write issues.

5. The method of claim 1, further comprising determining a stored corrective action for the set of call-path signatures from the set of functions.

6. The method of claim 5, further comprising displaying the set of call-path signatures from the set of functions and the stored corrective action on a display.

7. The method of claim 1, wherein the set of call-path signatures identify an issue of at least one of excessive writes, excessive crashes, and excessive energy usage for the particular application.

8. The method of claim 1, further comprising:

accessing a library storing one or more mitigation techniques that correspond to one or more corrective actions for the set of call-path signatures from the set of functions;

retrieving the one or more mitigation techniques that correspond to the one or more corrective actions; and displaying the one or more mitigation techniques that correspond to the one or more corrective actions.

9. The method according to claim 1, wherein the corrective action for the identified at least one function is provided to the user via a graphical user interface configurable by the user.

10. The method according to claim 1, wherein the corrective action for the identified at least one function is provided to the user via an electronic message notification including the identified function and the corrective action.

11. The method according to claim 1, wherein the application is a third party application.

12. A server device, comprising:

a memory comprising computer-executable instructions; and one or more processors in communication with the memory and configured to access the memory and execute the computer-executable instructions to perform operations comprising:

aggregating diagnostic logs received over a network from a plurality of electronic devices, each having a particular application installed, the diagnostic logs including information about call stacks within the particular application on the plurality of electronic devices for writing data to a storage device that is on each of the plurality of electronic devices, wherein the diagnostic logs are received after an application crosses a threshold amount of writes to a disk within a predetermined time period;

filtering out a set of call-paths from the call stacks to obtain a set of functions;

identifying a set of call-path signatures from the set of functions, wherein a call-path signature corresponds to a function at a particular location in a call stack;

for each function of the set of call-path signatures, determining a cumulative measure of resources usage by the function across the electronic devices;

identifying at least one function from the set of call-path signatures matching one or more predetermined criteria associated with the cumulative measure;

determining a corrective action for the identified at least one function; and providing the corrective action for the identified at least one function to a user of the server device.

13. The server device of claim 12, wherein the cumulative measure of resource usage comprises a number of calls to write.

14. The server device of claim 12, wherein the cumulative measure of resource usage comprises an amount of data written to the disk.

15. The server device of claim 12, wherein the one or more predetermined criteria includes being on a predetermined list of function signatures known to have known data write issues.

16. The server device of claim 12, further comprising:

accessing a library storing one or more mitigation techniques that correspond to one or more corrective actions for the set of call-path signatures from the set of functions;

retrieving the one or more mitigation techniques that correspond to the one or more corrective actions; and displaying the one or more mitigation techniques that correspond to the one or more corrective actions.

17. One or more non-transitory computer-readable storage medium comprising computer-executable instructions that, when executed by one or more processors, cause the one or more processors to perform operations on a server device comprising:

aggregating diagnostic logs received over a network from a plurality of electronic devices, each having a particular application installed, the diagnostic logs including information about call stacks within the particular application on the plurality of electronic devices for writing data to a storage device that is on each of the plurality of electronic devices, wherein the diagnostic logs are received after an application crosses a threshold amount of writes to a disk within a predetermined time period;

filtering out a set of call-paths from the call stacks to obtain a set of functions;

identifying a set of call-path signatures from the set of functions, wherein a call-path signature corresponds to a function at a particular location in a call stack;

for each function of the set of call-path signatures, determining a cumulative measure of resources usage by the function across the electronic devices;

identifying at least one function from the set of call-path signatures matching one or more predetermined criteria associated with the cumulative measure;

determining a corrective action for the identified at least one function; and providing the correction action for the identified at least one function to a user of the server device.

18. The one or more non-transitory computer-readable storage medium of claim 17, wherein the cumulative measure of resource usage comprises a number of calls to write.

19. The one or more non-transitory computer-readable storage medium of claim 17, wherein the cumulative measure of resource usage comprises an amount of data written to the disk.

20. The one or more non-transitory computer-readable storage medium of claim 17, wherein the one or more predetermined criteria includes being on a predetermined list of function signatures known to have known data write issues.

* * * * *